United States Patent [19]
Corth

[11] 3,992,646
[45] Nov. 16, 1976

[54] PLANT GROWTH TYPE FLUORESCENT LAMP

[75] Inventor: Richard Corth, Nutley, N.J.

[73] Assignee: Westinghouse Electric Corporation, Pittsburgh, Pa.

[22] Filed: Aug. 4, 1972

[21] Appl. No.: 277,942

[52] U.S. Cl. .............................................. 313/487
[51] Int. Cl.² ........................................ H01J 61/44
[58] Field of Search ..................... 313/109, 486, 487

[56] References Cited
UNITED STATES PATENTS

| | | | |
|---|---|---|---|
| 3,114,067 | 12/1963 | Henderson | 313/109 |
| 3,287,586 | 11/1966 | Bickford | 313/109 |
| 3,670,194 | 6/1972 | Thornton, Jr. et al. | 313/109 |

OTHER PUBLICATIONS

"Fluorescent Lamps and Lighting," edited by W. Elenbaas chapter III, sections 3.1 and 3.5, pp. 31,32,33,42,43,44, (1962).

Primary Examiner—Palmer C. Demeo
Attorney, Agent, or Firm—W. D. Palmer

[57] ABSTRACT

An inexpensive luminescent discharge lamp to efficiently stimulate balanced undistorted plant growth, the lamp emitting radiation having a spectral energy distribution such that the energy in the 400–500 nanometer (nm), 590–640 nm, 640–690 nm, and 690–800 nm bands are approximately in proportions of 0.8:1:1:1. The enumerated spectral energy distribution provide for a very high plant growth rate with balanced plant growth. Preferably the lamp uses a phosphor blend of about 95% by weight stannous tin activated strontium calcium magnesium orthophosphate and about 5% by weight divalent europium activated strontium chloroapatite.

5 Claims, 5 Drawing Figures

PLANT GROWTH TYPE FLUORESCENT LAMP

CROSS REFERENCE TO RELATED APPLICATION

In copending application Ser. No. 277,941, filed concurrently herewith and owned by the present assignee, and now abandoned, is disclosed a luminescent discharge lamp using a phosphor consisting essentially of calcium yttrium strontium phosphate activated by stannous tin which provides a spectral energy distribution similar to the tin activated strontium calcium magnesium orthophosphate blended with magnanese activated magnesium fluorogermanate plant growth lamp of the prior art, but at reduced cost and with the advantages of using a single phosphor rather than a blend. The instant invention provides substantially faster growth than this copending application at an even lower cost.

BACKGROUND OF THE INVENTION

The present invention relates to lamps to stimulate the growth of plants. Generally, it is desirable that the lamp stimulate the plant to approximately balanced plant growth rather than for example relatively long and thin plants which can be produced by improper blue to red ratios, high growth rate (generally measured by the rate of increase of dry weight of the plant) and efficiency, (typically measured by the amount of increase in dry weight per watt of input). It has been realized that while balanced plant growth can be obtained by a lamp whose spectral distribution diplicates sunlight, that such a lamp would be very inefficient as light would be supplied which would not be used and thus would be wasted energy. The green light for example is generally reflected rather than absorbed. Thus a plant growth lamp should provide the proper ratios of energy in the portions of the spectrum which effect plant growth but should not waste energy in portions of the spectrum which do not effect plant growth.

One type of plant growth illumination system which is commonly used is a combination of Cool White fluorescent lamps and incandescent lamps. This combination has been found to be quite productive for plant growth, but has disadvantages due to the use of the incandescent lamps. The incandescent lamps are shorter lived and expend a large amount of their energy in unused infrared radiation.

Illumination systems using only fluorescent lamps have also been used. One such growth lamp is described in U.S. Pat. No. 3,287,586 issued to E. D. Bickford on Nov. 22, 1966. This patent teaches that wide ranges of ratios of energy in the spectral regions of red to far red are acceptable. It also teaches relatively specific ratios in the spectral regions and the use of lead-intensified calcium tungstate blended with tin activated strontium orthophosphate.

Another fluorescent plant growth system is taught in British Pat. No. 1,231,633 issued May 12, 1971 to E. D. Bickford. This patent also teaches that a wide range in the ratio of red to far red is acceptable. This patent teaches a blend of tin activated strontium calcium magnesium orthophosphate with manganese activated magnesium fluorogermanate, with the fluorescent radiation in the blue and violet being negligible, the blue and violet radiation from the lamp deriving substantially entirely from the mercury discharge.

SUMMARY OF THE INVENTION

It has been discovered that a luminescent discharge lamp can efficiently provide balance plant growth only if ratios of energy in certain regions of the spectrum are maintained within a relatively narrow range. In addition, contrary to the preferred embodiments of the prior art, it has been found that a fairly high percentage of energy should be emitted in the far red. The instant invention calls for a spectral energy distribution such that the energy in the 400–500 nanometer blue band, the 590–640 nanometer orange band, the 640–690 nanometer red band and the 690–800 nanometer far red band be within about 15% of 0.8:1:1:1 proportions. Lamps using this energy distribution have given plant growth rates dramatically higher than growth rates of prior art lamps. Preferably the lamp uses about 95% by weight tin activated strontium calcium magnesium orthophosphate and about 5% by weight of divalent europium activated strontium chloroapatite.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENTS

Figure 1:
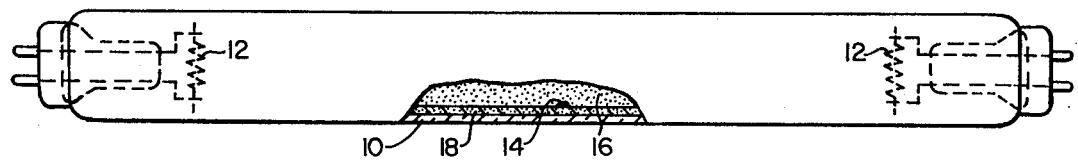
FIG. 1 is an elevation partly in section of a balanced-plant-growth-stimulating low pressure mecury discharge lamp.

While other types of discharge lamps such as a high pressure mercury lamp can be used to energize phosphors to provide the desired spectral energy distribution, a low pressure mercury discharge lamp is preferred. With reference to FIG. 1, there is shown a low pressure mercury vapor fluorescent lamp, wherein a conventional, elongated, tubular, soda-lime glass envelope 10 has operative discharge-sustaining electrodes 12 at opposite ends. The discharge sustaining material comprises mercury 14 and inert gas filling 16 as is well known in the art. A phosphor layer 18 is disposed on the interior surface of the envelope 10. In such a configuration, the phosphor layer 18 is the primary light generating medium and the electrodes 12 together with the discharge sustaining material comprise means for producing an electrical discharge within the envelope 10. The electrical discharge energizes the phosphor layer 18 to a light generating condition. The phosphor layer 18 and the electrical discharge are adapted to emit (through the envelope 10) radiation having a spectral energy distribution such that the energy in the 400–500 nm, 590–640 nm, 640–690 nm, and 690–800 nm bands are at least within about 15% of being within the proportions of 0.8:1:1:1. Lamps with the foregoing proportions of emission provide for significantly better plant growth than the widely used fluorescent lamps of the prior art. In tests in which dry plant weight was measured, the use of lamp of the instant invention gave 50% more lettuce plant weight, over 55% more corn plant weight, and over 55% more tomato plant weight. Tests also showed that tomato plants illuminated by the lamp of the instant invention produced 80% more ripe fruit.

For best performance the spectral distribution should be even more closely defined. It is preferable that the spectral energy distribution be within about 10% of the following values; 3% in the 300–400 nanometer band, 17% in the 400–500 nanometer band, 7% in the 500–550 nanometer band, 10% in the 550–590 nanometer band, 21% in the 590–640 nanometer band, 21% in the 640–690 nanometer band, and 21% in the 690–800 nanometer band. It should be noted that the energy emission levels in the bands having 10% or less of the emission are slightly less critical, but still important in plant growth and that excess emission in these bands in effectively wasted and detracts from lamp efficiency and there is some indication that they too effect the balance of plant growth.

One embodiment of the lamp of this invention is with a phosphor blend principally comprising stannous tin activated strontium calcium magnesium orthophosphate and also containing a phosphor principally emitting in the 400–500 nm blue band, with enough of this blue emitting phosphor included to attain the spectral energy distribution of at least within about 15% of the above described proportions of 0.8:1:1:1. Preferably this blend contains more than 80% by weight of tin activated strontium calcium magnesium orthophosphate. Preferably, divalent europium activated strontium chloroapatite is used as the blue emitting phosphor. A lamp made with a strontium chloroapatite phosphor would contain approximately 90–98% by weight of tin activated strontium magnesium orthophosphate and 2–10% by weight of divalent europium activated strontium chloroapatite. Preferably a 4 foot fluorescent lamp would have a phosphor consisting essentially of about 95% by weight of strontium calcium magnesium orthophosphate and about 5% by weight divalent europium activated strontium chloroapatite.

The strontium chloroapatite composition $Sr_5(PO_4)_3$ Cl: $Eu^{2+}$ is taught by copending application Ser. No. 768,455 filed Oct. 17, 1968 and owned by the present assignee. Tin acted strontium calcium magnesium phosphate can be prepared by firing a raw mix containing about 2.3 moles of SrO, 1.0 mole of $P_2O_6$3 0.027 mole of SnO, 0.3 mole of MgO, and 0.300 mole of CaO at about 1150° C in a 95% $N_2$ — 5% $H_2$ atmosphere for about 2 hours.

Although the strontium chloroapatite is the preferred host material for the divalent europium, other host materials such as aluminosilicate can also be used. Other activators in blue emitting phosphors (for example terbium activated yttrium phosphate) can also be used. Similarly, although the preferred embodiments use tin activated strontium calcium magnesium orthophosphates lamps, other phosphors such as tin activated strontium magnesium phosphate can also be used, especially when supplemented by a phosphor emitting generally in the 690–800 nm far red range such as iron activated lithium metaaluminate as well as a blue emitting phosphor) to provide proper proportions of spectral energy distribution.

Figure 2:
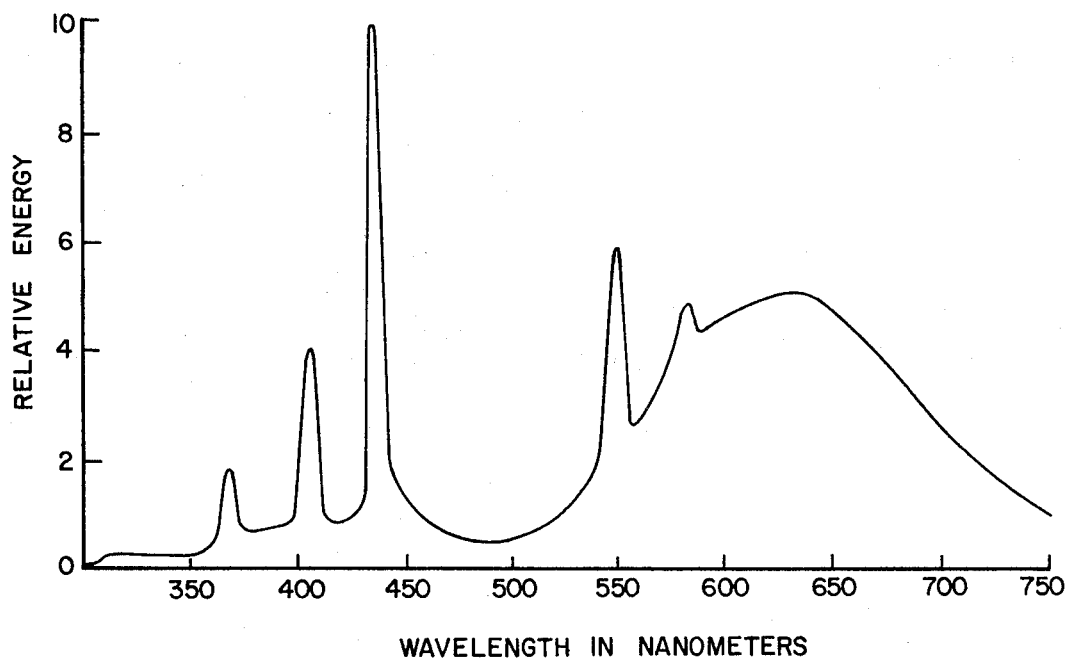
FIG. 2 is a graph of the spectral energy distribution of a preferred embodiment, showing the relative energy emitted at various wavelengths.

With reference to FIG. 2, there is shown the spectral power distribution for a 40 watt fluorescent plant growth lamp using 5% by weight of divalent europium activated strontium chloroapatite and 95% by weight of strontium calcium magnesium orthophosphate. As compared to either Cool White plus incandescent or the widely used plant growth lamp, lamps of this configuration produced much greater dry weight per watt. For example, these lamps gave more than 26% more radish root ("Cherry Belle") and 17% more Milo ("Wheatland"). In addition, the lamps of the instant invention produced more than 20% more blossoms when tested on "Red Velvet" Gloxinia. Further, the blossoms were longer lasting under the lamps of the instant invention than under the Cool White fluorescent plus incandescent combination. This longer life was possibly due to absence of extensive infrared radiation which is present with incandescent lamps.

Although the lamp of the preferred embodiment uses relatively expensive europium, the quantity used is very small as it is used only as an activator, and is used in the phosphor which is only about 5% of the blend. As a result, the blend is less expensive that the magnesium fluorogermanate blend of the prior art, which uses a significant quality of germanium.

I claim as my invention:

1. A luminescent discharge lamp to efficiently stimulate balanced plant growth, said lamp comprising a light transmitting envelope, phosphor means as the primary light-generating media coated on the interior surface of said envelope, and means for producing an electrical discharge within said envelope to energize said phosphor means to a light-generating condition, said phosphor means when energized exhibiting a predetermined emission spectrum, and the combined emission of said phosphor means and said discharge which passes through said envelop having a spectral energy distribution such that the energies in the 400–500 nm, 590–640 nm, 640–690 nm, and 690–800 nm bands are at least within about 15% of being within the proportions of 0.8:1:1:1.

2. The lamp of claim 1, wherein the spectral energy distribution is such that the energy in each of the bands is at least within about 10% of the following: 300–400 nm = 3%, 400–500 nm = 17%, 500–550 nm = 7%, 550–590 nm = 10%, 590–640 nm = 21%, 640–690 nm = 21%, and 690–800 nm = 21%.

3. The lamp of claim 1, wherein said phosphor means principally comprises stannous tin activated strontium calcium magnesium orthophosphate, and a phosphor principally emitting in the 400–500 nm band is included as a part of said phosphor means to attain said spectral energy distribution of at least within about 15% of being within said proportions of 0.8:1:1:1.

4. The lamp of claim 3 wherein said phosphor means consists essentially of 90–98% by weight of tin activated strontium calcium magnesium orthophosphate and 2–10% by weight of divalent europium activated strontium chloroapatite.

5. The lamp of claim 4, wherein said lamp consists essentially of a four foot fluorescent lamp having a phosphor consisting essentially of about 95% by weight of strontium calcium magnesium orthophosphate and about 5% by weight of divalent europium activated strontium chloroapatite.

* * * * *